(12) United States Patent
Warren et al.

(10) Patent No.: US 6,232,392 B1
(45) Date of Patent: May 15, 2001

(54) TEMPORARY WATER-WASHABLE COATING FOR SPRAY BOOTHS AND VEHICLES DURING ASSEMBLY

(75) Inventors: Jonathan N. Warren, Dearborn; Finn Bergishagen, West Bloomfield, both of MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/337,091

(22) Filed: Jun. 21, 1999

Related U.S. Application Data

(60) Provisional application No. 60/091,607, filed on Jul. 2, 1998, and provisional application No. 60/090,506, filed on Jun. 24, 1998.

(51) Int. Cl.[7] ............................................... C08L 67/00
(52) U.S. Cl. ......................................................... 524/513
(58) Field of Search ............................................... 524/513

(56) References Cited

U.S. PATENT DOCUMENTS

| | | | |
|---|---|---|---|
| 4,039,333 | 8/1977 | Shinagawa et al. | 96/84 R |
| 4,183,772 | * 1/1980 | Davis | 148/6.16 |
| 4,562,226 | 12/1985 | Coombes et al. | 524/767 |
| 4,600,761 | 7/1986 | Ruffner et al. | 526/270 |
| 4,616,074 | 10/1986 | Ruffner | 526/318 |
| 4,735,995 | * 4/1988 | Chettiath | 525/301.5 |
| 4,743,698 | 5/1988 | Ruffner et al. | 549/478 |
| 5,143,949 | 9/1992 | Grogan et al. | 523/334 |
| 5,191,014 | 3/1993 | Roberts et al. | 524/831 |
| 5,260,161 | 11/1993 | Matsumura et al. | 430/161 |
| 5,330,788 | 7/1994 | Roberts | 427/154 |
| 5,411,760 | 5/1995 | Woodhall et al. | 427/156 |
| 5,428,095 | 6/1995 | Swidler | 524/389 |
| 5,443,748 | 8/1995 | Bergishagen . | |
| 5,453,459 | 9/1995 | Roberts | 524/123 |
| 5,567,756 | 10/1996 | Swidler | 524/389 |
| 5,604,282 | 2/1997 | Grogan et al. | 524/232 |
| 5,905,105 | * 5/1999 | Jones | 524/413 |

FOREIGN PATENT DOCUMENTS

| | | |
|---|---|---|
| 2096324 | 11/1994 | (CA) . |
| 50-067845 | 6/1975 | (JP) . |
| 50-039685 | 12/1975 | (JP) . |
| 56-022368 | 3/1981 | (JP) . |
| 03008476 | 1/1991 | (JP) . |
| WO90/01051 | 2/1990 | (WO) . |
| WO91/14722 | 10/1991 | (WO) . |
| WO93/01243 | 1/1993 | (WO) . |
| WO93/25624 | 12/1993 | (WO) . |

OTHER PUBLICATIONS

"Personal Care Polymers, Rheologhy Modifiers", a technical bulletin of National Starch and Chemical Co. (1995).
3M Fluorad™ Fluorosurfactants Selection Guide.
"Rheological Additives for Waterborne Systems", a technical brochure by Rheox, Inc. (1995).
"Acrysol® Associative Thickeners", a technical bulletin by Rohm & Haas.
"Associative Thickeners and Their Use in Hair Treatment Compositions", by Cardinali, et al of National Starch and Chemical Co. (1995).
Preliminary Data Sheet: Disperbyk®–180, Disperbyk®–182, Disperbyk®–183, Disperbyk®–184, Disperbyk®–190, Technical Binder, BYK Chemie USA.
Data Sheet: BYK®–380, BYK®–381, Byketol®–WS, Technical Binder, BYK Chemie USA, 11/96.
"JONCRYL® Selection Guide, Graphic Arts", Technical Brochure, S.C. Johnson Polymer, S.C. Johnson & Son, Inc. (no date).
"High Performance Products for Coatings"Technical Brochure, B.F. Goodrich, Feb. 1995.
Material Safety Data Sheet, Polykleer 1000, effective Jun. 25, 1997.

* cited by examiner

Primary Examiner—Paul R. Michl
(74) Attorney, Agent, or Firm—Deborah M. Altman; Jacques B. Miles; Ann Marie Cannoni

(57) ABSTRACT

A waterborne barrier coating composition is provided for protecting interior wall, window and adjacent floor surfaces of paint spray booths from the adherence of unwanted paint overspray. The composition can also be used to protect decorative finishes from damage during assembly processes. The coating composition is applied via brush or spray methods as a mixture of water solubilized styrene/acrylic or acrylic acid polymer, alkali-swellable Acrylate/Steareth-20 Itaconate acid copolymer or alkali-swellable Acrylate/Ceteth-20 Itaconate acid copolymer, and water. No surfactant or polyol is required to form a suitable coating. The composition provides a fast drying transparent or pigmented hard coating that is easily removed by cold water.

11 Claims, No Drawings

TEMPORARY WATER-WASHABLE COATING FOR SPRAY BOOTHS AND VEHICLES DURING ASSEMBLY

CROSS-REFERENCE TO RELATED APPLICATIONS

This application claims the benefit of U.S. Provisional Application No. Serial No. 60/090,506 filed Jun. 24, 1998, and U.S. Provisional Application No. 60/091,607 filed Jul. 2, 1998, which are hereby incorporated by reference.

FIELD OF THE INVENTION

The present invention relates to an improved, water based, cold-water washable temporary barrier coating to prevent paint overspray from contacting the interior surfaces of paint spray booths. The coating can be clear or pigmented. The invention can also be used to provide temporary protection to decorative finishes during an assembly process.

BACKGROUND OF THE INVENTION

The present invention relates to the protection of interior wall, window, and adjacent floor surfaces in and around a paint spray booth. The manufacture of many goods requires the application of a decorative finish, either for appearance or protection. The application of a decorative finish is usually performed inside an enclosed area or spray booth. Generally, a spray booth encompasses a sealed chamber with a clean air supply and removal system. The item to be painted is placed inside the booth, and application of the paint is accomplished via hand or automatic spray equipment. Due to paint transfer efficiencies of usually 60% at best, a good deal of the sprayed paint becomes entrained in the booth air flow and ultimately is deposited on the interior surfaces and equipment inside the spray booth. This uncured paint "overspray" fouls the walls and floor and is easily tracked outside the paint booth by workers' shoes and equipment. If allowed to accumulate, this overspray limits visibility through windows in the spray booth, reduces airflow in the booth by narrowing the gap in floor grates, and creates unsafe work conditions by making walking surfaces and equipment slippery. This is especially true in the automotive assembly industry where the uncured paint overspray remains wet unless cured via heating.

Dry time of the coating is an important factor. Spray booth cleaning and maintenance in automotive assembly plants is typically done on shifts when the assembly line is not running. Occasionally, application of paint removers and coatings is done in a brief time interval between a first and second production shift. The varying demands of maintenance schedules require a coating to dry within 2 hours and sometimes within 30 minutes or less of application. Usage of waterborne coatings here presents dry time problems due to the dependence of the coating on the evaporative conditions present in the booth (humidity, temperature and air flow). Many chemical masks dry too slow for applications in time constrained maintenance environments. In addition, many chemical masks do not provide a coating with the transparency or clarity required for unhindered viewing through glass windows in spray booths.

The assembly operations performed on a vehicle, component, or assembly having a decorative finish can be detrimental to this finish. It is often necessary to mask portions of said items to prevent damage. In practice, masking decorative finishes is a costly, time and labor intensive process, sometimes involving additional disposal costs for peelable or paper and plastic-type masking products.

It has long been known that removal of said paint overspray by solvent wiping or spraying is a very effective method. But in view of worker safety and the ever increasing regulation of solvent waste disposal and volatile organic compound air emissions, this approach is losing favor in industry.

Various chemical coating solutions have been posed for protecting spray booths from uncured paint overspray. However, such solutions have not often been successful or found extensive use. Some proposed chemical masks are peelable. These coatings suffer from application difficulties with film thickness; if the coating is not applied thick enough, peelability is compromised. Difficulty in peeling the applied coating from complex surfaces, rivets, and seams of paint spray booths has also be experienced.

Other chemical masks require heated, alkaline, and/or high pressure water for removal; three attributes of water not typically available to maintenance crews cleaning spray booths.

Yet another difficulty is the need to add a surface tension-modifying agent to provide wetting and flow to the coating. Use of said agent adds cost to the coating, and if allowed to accumulate in a spray booth water system, can cause several detrimental effects including paint defects and foaming of the paint booth detackification system.

To produce a tacky, plasticized coating, some chemical coatings solutions require the incorporation of glycerin. Although effective, this plasticizer can impart excessive water absorption and higher surface tension. Excessive water absorption can result in sagging or running of the coating, while high surface tension can result in poor wetting and film formation.

Film clarity in both the wet and dry phase of the film is important. Some assembly plants, especially ones having short application and dry times, require a coating which has excellent transparency when wet and dry. Some current coatings products suffer from poor film transparency or clarity, both in the wet and dry phase.

Some of the above concerns effect application of some of the proposed chemical masks on decorative finishes as well. Ease of removal is required of the protective coating if it is to be non-injurious to the decorative finish. Peeling operations or use of an alkaline water wash could have negative impacts on the appearance a fresh-applied decorative finish.

From the above, it is seen that an improved barrier masking composition with excellent wetting, clarity, durability, and cold water rinsability is called for.

SUMMARY OF THE INVENTION

An improved temporary barrier masking and scratch protectant is provided by virtue of the present invention. The use of water solubilized acrylic polymer and/or acrylic copolymer like styrene/acrylic copolymers provides a low surface tension solution that imparts excellent wetting and flow and leveling properties, negating the need for additional surface tension additives. Additionally, films of styrene/acrylic acid copolymer have excellent cold-water rinsing properties.

The excellent flow, leveling, and durable nature of the acrylic polymer and copolymers like styrene/acrylic copolymers allow the application of a thinner film than is typically applied using conventional chemical masks. This improves the cost effectiveness of the product and dry time of the composition by reducing the amount of water present.

Thickening the composition renders a coating that will adhere to a vertical surface. In the case of the present invention, the use of a rheological additive discussed below provides excellent thickening at low incorporation levels, maximizing the benefits of the styrene/acrylic acid copolymer. Variations in neutralizing bases impart varying degrees of hardness to the coating. In order of increasing hardness are the potassium, sodium, and lithium salts of the styrene/acrylic acid copolymer. Although not required to solubilize the polymers, heating the process water can be performed to speed manufacture if necessary.

The coating composition in one specific embodiment has at least one water solubilized acrylic polymer and/or acrylic copolymer like styrene/acrylic acid copolymer, at least one alkali swellable copolymer of acrylic and polyester with fatty acid or alcohol moieties having from 14 to 30 carbon atoms like acrylate/steareth-itaconate copolymer and/or alkali swellable acrylate/Ceteth-itaconate copolymer, as a rheological additive, and water. This composition provides a hard, transparent coating that is easily removed with cold water.

In a different embodiment an amine is incorporated in the neutralization step of the styrene/acrylic acid copolymer, providing a softer, tacky film for use as an interior spray booth wall coating capable of attracting airborne particulates.

In yet another embodiment, the coating composition contains a pigment dispersion of titanium dioxide and/or inorganic filler pigment to provide a white color for either the hard or tacky coating.

Although not required to form a suitable film, additional components can be added to the coating composition to provide thickening, wetting, and rinsing benefits. The addition of surface tension modifying agents like the Fluorad® agents of the series manufactured by 3M or other agents known in the art can provide additional flow and leveling if necessary. The addition of fatty acids, various amides and sulfates, and other associative thickener activators as cited in the literature can improve the thickening efficiency of the alkali swellable copolymer of acrylic and polyester with fatty acid or alcohol moieties.

DETAILED DESCRIPTION OF THE INVENTION

The present invention provides an improved cold-water washable barrier coating composition and method for the protection of the interior surfaces of paint spray booths from the accumulation of paint overspray. Additionally, this invention can be used as a barrier coating to protect articles having decorative finishes from abrasion, marring, scratching, and other deleterious damage during an assembly or repair process.

The coating composition of the present invention can be applied using air assisted, airless, or HVLP spray equipment, or by other conventional means such as brush or roller.

The method and coating composition produces a continuous barrier coating which dries quickly on the surface to be protected, with few if any pin holes. When dry, the coating shows better resistance to the absorption of water observed in other coating compositions under typical high humidity conditions found in many spray booths. This barrier coating can be easily cold-water rinsed using normal tap pressures without any negative effect to the protected surface.

The protective barrier coating composition of the present invention includes at least one water solubilized acrylic acid polymer and/or copolymer like styrene/acrylic acid copolymer, at least one alkali swellable copolymer of acrylic and polyester with fatty acid or alcohol moieties having from 14 to 30 carbon atoms and water. By the term "alkali swellable" it is meant that the addition of an alkali to the copolymer in solid or liquid latex form will cause the latex to thicken and show an increase in viscosity. To obtain this thickening effect and increase in viscosity, the polymer in the latex can comprise a small portion, of for example about 3% by weight of total polymerized monomers, of one or more copolymerized ethylenically unsaturated monomer to add ionization to the polymer. Examples of such aforementioned alkali swellable copolymers of acrylic and polyester include those with ethoxylation in a stearyl or cetyl nonionic hydrophobe associated through itaconic acid linkage to the acrylic polymer backbone such as in Acrylate/Steareth-20 Itaconate copolymer and/or alkali swellable Acrylate/Ceteth-20 Itaconate copolymer. An additional example includes acrylic-methylene succinic ester emulsion copolymers as disclosed in U.S. Pat. No. 4,616,074. Variations include the addition of pigment dispersions and the solubilization of the acrylic polymer or styrene/acrylic acid copolymer with various alkali metal salts and amines. Additional variations include additives for the modification of surface tension, control of rinsing, and dispersion of pigment; biocides for the control of bacterial growth, and alcohols to speed the drying time of the composition.

In a suitable embodiment, the coating composition contains between about 1 and 40% of a water solubilized styrene/acrylic acid copolymer with an acid number between 53–270 and glass transition temperature between 50–128° C. or water solubilized acrylic acid polymer with an acid number between 30–150 and glass transition temperature between 25–70° C.; between about 0.1 and 10% of a alkali swellable Acrylate/Steareth-20 Itaconate copolymer solution; sodium hydroxide or amine, and water. The final pH of the resulting coating composition is generally adjusted to a range of 7 to about 12.5.

In a preferred embodiment, the coating composition contains between 1 and 12% of a water solubilized styrene/acrylic acid copolymer with an acid number between 53 and 270 and glass transition temperature between 50–128° C.; between about 0.1% and 4% of an alkali swellable Acrylate/Steareth-20 Itaconate copolymer solution such as Structure® additives from National Starch; potassium hydroxide or amine, the balance being water with a conductivity of about 18 mhos/cm. The final pH of the resulting coating composition is generally adjusted to a range of 7 to about 12.5, and preferably in a range of 7 to 8.

The following examples are intended to illustrate the present invention and are in no way intended to limit the scope of the invention.

TABLES 1 & 1A

CLEAR COATING EXAMPLES CP1 TO CP28

A series of compositions were prepared by blending various components together at room temperature and atmospheric pressure. The Styrene/acrylic or acrylic polymers were first solubilized in deionized water with a base such as sodium, potassium, or lithium hydroxide or an amine to a pH of between 9 and 10; then a solution of an alkali swellable acrylic acid polymer was added to facilitate thickening. Mixing was accomplished with a marine propeller to a neutral pH, forming a suitable barrier coating composition of the present invention.

TABLE 1

CLEAR COATING EXAMPLES
Dry Wt. %

| | CP1 | CP2 | CP3 | CP4 | CP5 | CP6 | CP7 | CP8 | CP9 | CP10 | CP11 | CP12 | CP13 | CP14 | CP17 |
|---|---|---|---|---|---|---|---|---|---|---|---|---|---|---|---|
| DI Water | 96.29 | 96.16 | 96.43 | 95.35 | 96.29 | 96.16 | 96.43 | 95.35 | 93.28 | 77.35 | 93.76 | 92.65 | 92.03 | 92.86 | 92.03 |
| Styrene/Acrylic copolymer[1] | 2.40 | 2.40 | 2.40 | 2.40 | 2.40 | 2.40 | 2.40 | 2.40 | 4.80 | 16.80 | | | | 4.80 | |
| Styrene/Acrylic copolymer[2] | | | | | | | | | | | 4.80 | 4.80 | 4.80 | | 4.80 |
| Alkali swellable Acrylate/Steareth-20 Itaconate copolymer[3] | 0.97 | 0.97 | 0.97 | 0.97 | | | | | | | | | | | |
| Alkali swellable Acrylate/Steareth-20 Itaconate copolymer[4] | | | | | 0.97 | 0.97 | 0.97 | 0.97 | 0.97 | 1.97 | 0.97 | 0.97 | 0.97 | 0.98 | 0.97 |
| NaOH | 0.34 | | | | 0.34 | | | | | | | 0.79 | | 0.68 | 1.10 |
| KOH | | 0.47 | | | | 0.47 | | | 0.95 | 3.88 | | | 0.99 | | |
| LiOH | | | 0.20 | | | | 0.20 | | | | 0.47 | | | | |
| Triethanolamine 99% | | | | 1.28 | | | | 1.28 | | | | | | | |

[1]Carboset GA 1161 available from B. F. Goodrich.
[2]Carboset GA 1162 available from B. F. Goodrich.
[3]Structure 2000 available from National Starch.
[4]Structure 2001 available from National Starch.

TABLE 1A

CLEAR COATING EXAMPLES CONTINUED
% Dry Wt.

| | CP19 | CP20 | CP21 | CP22 | CP23 | CP24 | CP25 | CP26 | CP27 | CP28 |
|---|---|---|---|---|---|---|---|---|---|---|
| DI Water | 93.16 | 93.16 | 93.16 | 93.03 | 92.88 | 93.2 | 93.92 | 93.67 | 93.91 | 93.64 |
| Styrene/acrylic copolymer[1] | 4.80 | | | | | | | | | |
| Styrene/acrylic copolymer[2] | | 4.80 | | | | | | | | |
| Styrene/acrylic copolymer[3] | | | 4.80 | | | | | | | |
| Styrene/acrylic copolymer[4] | | | | 4.80 | | | | | | |
| Styrene/acrylic copolymer[5] | | | | | 4.80 | | | | | |
| Styrene/acrylic copolymer[6] | | | | | | 4.80 | | | | |
| Acrylic colloidal dispersion[7] | | | | | | | 4.80 | | | |
| Acrylic polymer[8] | | | | | | | | 4.80 | | |
| Acrylic polymer[9] | | | | | | | | | 4.80 | |
| Acrylic polymer[10] | | | | | | | | | | 4.80 |
| Alkali swellable Acrylate/Steareth-20 Itaconate copolymer[11] | 0.97 | 0.97 | 0.97 | 0.97 | 0.97 | 0.97 | 0.81 | 0.96 | 0.57 | 0.99 |
| NaOH | | | | | | | | 0.24 | 0.24 | 0.36 | 0.29 |
| KOH | 1.07 | 1.07 | 1.07 | 1.20 | 1.35 | 1.03 | | | | |

[1]Joncryl 67 from S. C. Johnson
[2]Joncryl HPD 671 from S. C. Johnson
[3]Joncryl 680 from S. C. Johnson
[4]Joncryl 682 from S. C. Johnson
[5]SCX - 686 from S. C. Johnson
[6]Joncryl 683 from S. C. Johnson
[7]Carboset 515 from B. F. Goodrich
[8]Carboset 525 from B. F. Goodrich
[9]Carboset 526 from B. F. Goodrich
[10]Carboset 527 from B. F. Goodrich
[11]Structure 2001 from National Starch

TABLE 2

PIGMENTED COATINGS EXAMPLES WP1 TO WP6

A series of compositions were prepared by blending various components together at room temperature and atmospheric pressure. The Styrene/acrylic copolymer was first solubilized in deionized water with a base such as sodium or potassium hydroxide to a pH of between 9 and 10. A pigment dispersion of titanium dioxide and deionized water was prepared with a high molecular weight block co-polymer and added to the solubilized styrene/acrylic copolymer; then a solution of an alkali swellable acrylic acid polymer was added to facilitate thickening. Mixing was accomplished with a marine propeller to a neutral pH, forming a suitable pigmented barrier coating composition of the present invention.

TABLE 2

PIGMENTED COATINGS EXAMPLES
% Dry wt.

|  | WP1 | WP2 | WP3 | WP4 | WP5 | WP6 |
|---|---|---|---|---|---|---|
| DI Water | 93.37 | 90.36 | 89.26 | 89.38 | 89.26 | 89.38 |
| Styrene/Acrylic copolymer[1] | 2.40 | 4.80 | 6.00 | 6.00 | 6.00 | 6.00 |
| Alkali swellable Acrylate/Steareth-20 Itaconate copolymer[2] | 0.97 | 0.97 | 0.97 | 0.97 | | |
| Alkali swellable Acrylate/Steareth-20 Itaconate copolymer[3] | | | | | 0.97 | 0.97 |
| Titanium Dioxide | 2.80 | 2.80 | 2.80 | 2.80 | 2.80 | 2.80 |
| High molecular weight block copolymer[4] | 0.12 | 0.12 | 0.12 | | 0.12 | |
| NaOH | 0.34 | | 0.85 | 0.85 | 0.85 | 0.85 |
| KOH | | 0.95 | | | | |

[1]Carboset GA 1161 from B. F. Goodrich
[2]Structure 2000 from National Starch
[3]Structure 2001 from National Starch
[4]Dysperbyk 190 available from Byk Chemie

TABLE 3

CLEAR TACKY COATING EXAMPLES CT1 TO CT11

A series of compositions were prepared by blending various components together at room temperature and atmospheric pressure. The Styrene/acrylic copolymer was first solubilized in deionized water with a base such as potassium hydroxide or an amine to a pH of between 9 and 10; then a glycol was added to the mixture. A solution of an alkali swellable acrylic acid polymer was then added to facilitate thickening. Mixing was accomplished with a marine propeller to a neutral pH, forming a suitable clear-tacky barrier coating composition of the present invention.

TABLE 3

CLEAR TACKY COATING EXAMPLES
% Dry Wt.

|  | CT1 | CT2 | CT3 | CT4 | CT5 | CT6 | CT7 | CT8 | CT9 | CT10 | CT11 |
|---|---|---|---|---|---|---|---|---|---|---|---|
| DI Water | 88.23 | 86.25 | 93.31 | 88.31 | 85.81 | 83.31 | 88.23 | 85.73 | 83.23 | 91.59 | 83.75 |
| Styrene/Acrylic copolymer[1] | 4.80 | 4.80 | 4.80 | 4.80 | 4.80 | 4.80 | 4.80 | 4.80 | 4.80 | 4.8 | 4.8 |
| Alkali swellable Acrylate/Steareth-20 Itaconate copolymer[2] | 0.98 | 0.98 | 0.90 | 0.90 | 0.90 | 0.90 | 0.98 | 0.98 | 0.98 | 0.98 | 0.98 |
| Triethanolamine 99% | | 2.97 | | | | | | | | | 2.97 |
| Diisopropanolamine | | | | | | | | | | 2.63 | |
| KOH | 0.99 | | 0.99 | 0.99 | 0.99 | 0.99 | 0.99 | 0.99 | 0.99 | | |
| Diethylene Glycol | 5.00 | 5.00 | | 5.00 | 7.50 | 10.00 | 5.00 | 7.50 | 10.00 | | 7.5 |

[1]Carboset GA 1162 product available from B. F. Goodrich.
[2]Structure 2001 available from National Starch.

TABLE 4

PIGMENTED TACKY COATINGS EXAMPLES WT1 TO WT16

A series of compositions were prepared by blending various components together at room temperature and atmospheric pressure. The Styrene/acrylic copolymer was first solubilized in deionized water with a base such as potassium hydroxide or an amine to a pH of between 9 and 10. A pigment dispersion of titanium dioxide and deionized water was prepared with a high molecular weight block co-polymer and added to the solubilized styrene/acrylic copolymer, along with a glycol such as propylene or diethylene glycol. Then a solution of an alkali swellable acrylic acid polymer was added to facilitate thickening. Mixing was accomplished with a marine propeller to a neutral pH, forming a suitable tacky, pigmented barrier coating composition of the present invention.

TABLE 4

PIGMENTED TACKY COATING EXAMPLES
% Dry Wt.

| | WT1 | WT2 | WT3 | WT4 | WT5 | WT6 | WT7 | WT8 | WT9 | WT10 | WT11 | WT12 | WT13 | WT14 | WT15 | WT16 |
|---|---|---|---|---|---|---|---|---|---|---|---|---|---|---|---|---|
| DI Water | 85.04 | 82.54 | 90.19 | 87.81 | 84.79 | 82.69 | 80.19 | 88.55 | 88.15 | 88.21 | 87.81 | 82.81 | 80.31 | 77.81 | 93.02 | 85.52 |
| Styrene/Acrylic copolymer[1] | | | | | | | | | | | | | | | 4.80 | 4.80 |
| Styrene/Acrylic copolymer[2] | 4.80 | 4.80 | 4.80 | 4.80 | 4.80 | 4.80 | 4.80 | 4.80 | 4.80 | 4.80 | 4.80 | 4.80 | 4.80 | 4.80 | | |
| Alkali swellable Acrylate/Steareth-20 Itaconate copolymer[3] | 0.98 | 0.98 | 0.98 | 0.98 | 0.98 | 0.98 | 0.98 | 0.98 | 0.98 | 0.98 | 0.98 | 0.98 | 0.98 | 0.98 | 0.98 | 0.98 |
| Titanium Dioxide | 2.80 | 2.80 | 2.80 | 2.80 | 2.80 | 2.80 | 2.80 | 2.80 | 2.80 | 2.80 | 2.80 | 2.80 | 2.80 | 2.80 | 2.80 | 2.80 |
| Acrylic copolymer, nonionic[4] | | 0.24 | 0.24 | 0.24 | 0.24 | 0.24 | 0.24 | 0.24 | 0.24 | 0.24 | 0.24 | 0.24 | 0.24 | 0.24 | 0.24 | 0.24 |
| Triethanolamine 99% | 2.98 | 2.98 | | 2.97 | | | | | | | 2.97 | 2.97 | 2.97 | 2.97 | 2.56 | 2.56 |
| Diisopropanolamine | | | | | | | | 2.63 | 2.63 | | | | | | | |
| KOH | | | 0.99 | | 0.99 | 0.99 | 0.99 | | | | | | | | | |
| Propylene Glycol | 2.50 | | | | | | | | | | | | | | | |
| Diethylene Glycol | | 5.00 | | | 5.00 | 7.50 | 10.00 | | | | | 5.00 | 7.50 | 10.00 | | 7.50 |
| Tall oil fatty acid | 0.70 | 0.70 | | 0.40 | 0.40 | | | | 0.40 | | 0.40 | 0.40 | 0.40 | 0.40 | 0.40 | 0.40 |
| Fluorad FC 100 | 0.20 | 0.20 | | | | | | | | | | | | | | |

[1]Carboset GA 1161 available from B. F. Goodrich.
[2]Carboset GA 1162 available from B. F. Goodrich.
[3]Structure 2000 from National Starch.
[4]Byk 380 from Byk Chemie.

TABLE 5

COMPARATIVE EXAMPLES C1 TO C8

A series of compositions were prepared by blending various components together at room temperature and atmospheric pressure. The Styrene/acrylic copolymer was first solubilized in deionized water with a base such as sodium or potassium hydroxide to a pH of between 9 and 10; then a solution of an alkali swellable acrylic acid polymer was added to facilitate thickening. The alkali swellable acrylic acid polymers in these examples represent alternatives to the acrylate/steareth-20 or ceteth-20 itaconate polymers used in previous examples. Mixing was accomplished with a marine propeller to a neutral pH, forming a suitable barrier coating composition of the present invention.

TABLE 5

COMPARATIVE EXAMPLES
% Dry Wt.

| | C1 | C2 | C3 | C4 | C5 | C6 | C7 | C8 |
|---|---|---|---|---|---|---|---|---|
| DI water | 93.27 | 92.76 | 91.15 | 93.27 | 92.28 | 93.27 | 92.75 | 92.15 |
| Styrene/Acrylic copolymer[1] | 4.80 | 4.80 | 4.80 | 4.80 | 4.80 | 4.80 | 4.80 | 4.80 |
| Alkali swellable acrylic copolymer[2] | 0.98 | | 3.10 | | | | | |
| Modified alkali swellable acrylic copolymer[3] | | | | | | 0.98 | 1.50 | 2.10 |
| Alkali swellable acrylic copolymer[4] | | 1.49 | | 0.98 | 1.97 | | | |
| KOH | 0.95 | 0.95 | 0.95 | 0.95 | 0.95 | 0.95 | 0.95 | 0.95 |

[1]Carboset 1161 from B. F. Goodrich.
[2]Rheolate 1 from Rheox, Inc.
[3]Rheolate 420 from Rheox, Inc.
[4]Acusol 810A from Rohm & Haas Inc.

Each of the listed compositions were tested as follows. Viscosity measurements were made at room temperature using a LVT Brookfield viscometer, #3 and #4 spindles, at 12 rpm.

Humidity sensitivity was determined by placing two 24-hour aged 4×6" panels, each of the coating at 5.0 mils wet in a humidity chamber and observing the response of the coating to high temperature and humidity at intervals of 15 minutes for a total of one hour. High temperature and humidity is defined as 85 to 100° F. air temperature at 80 to 85% relative humidity. These are comparable to extreme conditions experienced in automotive spray booths during the summer months in North America. The sensitivity was rated on a scale of 1 to 5, with 5 defined as the best humidity resistance (least film tackiness or sliding of coating).

Film integrity is defined as a continuous, hard to semi hard coating which does not flake or peel from the substrate.

Film clarity is defined as a being a water-clear film, with no haze. Again, a scale of 1 to 5 is used, with 5 defined as the best clarity, with no haze present, while 1 would indicate a very cloudy or hazy film.

Wetting relates to surface smoothness and the presence of an "orange peel" effect during the wet and dry phase of the film drying sequence. The 1 to 5 scale defines 5 as being the smoothest film, while one has the most "orange peel". Spray application was evaluated via HVLP at 6 psi tip pressure onto a clean glass substrate. Drawdowns were performed on glass with a bird yielding a film thickness 5 mils wet.

Rinsability is defined as a cold water rinse under tap-pressure water. On the 1 to 5 scale, 5 indicates the fastest rinsing of the film from the substrate.

with cold water, dried, and examined for detrimental appearance effects and gloss reduction. Upon examination, no reduction in gloss was observed.

The advantages of the invention will now be apparent. The invention provides a solvent and paint resistant barrier coating composition with exceptional clarity, while providing mar and scratch protection when applied to a substrate. The use of the styrene/acrylic copolymer provides an excellent film with low surface tension, yielding a coating with outstanding wetting and air release properties. Use of the alkali-swellable acrylate/steareth-20 itaconate copolymer provides exceptional thickening at low incorporation levels,

TABLE 6

| Composition | Viscosity (cps) | 60' $H_2O$ Sensitivity $(1-5)^1$ | Film Integrity $(1-5)^1$ | Film Clarity Wet $(1-5)^1$ | Dry $(1-5)^1$ | Wetting Spray $(1-5)^1$ | Draw down $(1-5)^1$ | Rinsability $(1-5)^1$ |
|---|---|---|---|---|---|---|---|---|
| Clear examples | | | | | | | | |
| CP11 | 8900 | 4.5 | 3 | 5 | 5 | 5 | 5 | 5 |
| CP12 | 6800 | 4.5 | 5 | 5 | 4.5 | 5 | 5 | 5 |
| CP13 | 6400 | 4 | 5 | 5 | 5 | 5 | 5 | 5 |
| CP19 | 1100 | 5 | 5 | 2 | 4 | 2 | 5 | 5 |
| CP20 | 1500 | N/A | 0 | 2 | 4.5 | 2 | 5 | 5 |
| CP21 | 2200 | 4.5 | 5 | 3 | 5 | 3 | 5 | 5 |
| CP22 | 16000 | 3 | 5 | 4 | 4 | 2 | 4 | 4.5 |
| CP25 | 1100 | 3 | 5 | 4 | 5 | 4 | 4 | 5 |
| CP26 | 2100 | 4.5 | 5 | 4 | 5 | 5 | 5 | 5 |
| CP27 | 500 | 5 | 5 | 2.5 | 3 | 5 | 5 | 2 |
| CP28 | 4100 | 5 | 5 | 5 | 5 | 5 | 5 | 3.5 |
| Comparative examples | | | | | | | | |
| C1 | 20 | 3.5 | 5 | 4 | 4 | 2 | 5 | 5 |
| C2 | 500 | 3 | 5 | 1 | 2 | 1 | 4 | 5 |
| C3 | 970 | 3 | 5 | 4 | 4.5 | 2 | 5 | 4 |
| C4 | 190 | 5 | 1 | 2 | 2 | 2 | 5 | 2 |
| C5 | 1000 | 5 | 1 | 1 | 3 | 1 | 5 | 4.5 |
| C6 | 75 | 3 | 5 | 4 | 4.5 | 2 | 5 | 5 |
| C7 | 460 | 4 | 5 | 3 | 4.5 | 3 | 5 | 5 |
| C8 | 1400 | 4 | 5 | 3 | 2.5 | 3 | 3 | 5 |
| Pigmented examples | | | | | | | | |
| WP3 | 3900 | 3 | 5 | N/A | N/A | 5 | 5 | 5 |
| WP4 | 3750 | 2 | 5 | N/A | N/A | 5 | 5 | 5 |
| WP5 | 7100 | 3 | 5 | N/A | N/A | 5 | 5 | 5 |
| WP6 | 5200 | 2 | 5 | N/A | N/A | 5 | 5 | 5 |

$^1$(1–5 SCALE: 5 = BEST)

The results of testing as shown in Table 6 shows the benefit of the invention. Compositions of the invention achieved the highest viscosity builds and best overall ratings for all tests conducted. While some of the comparative examples performed well in certain areas, none were consistently excellent.

ABRASION PROTECTION TESTING

To test the scratch resistance of the present invention, several panels were painted with a standard automotive OEM basecoat/clearcoat paint supplied by BASF, Inc. This paint was cured, then coated with the clear barrier coating of the present invention. The clear coating was allowed to dwell on the panel for 24 hours, then tested for scratch resistance using an abrasive kitchen scouring pad, lightly rubbed on the surface. The clear barrier coating was then rinsed from the painted panel using cold water and examined for scratches. None were observed.

In another test, panels from the same painted batch were measured for gloss, then coated with the clear barrier coating and allowed to set for 24 hours. The coating was then rinsed maximizing the benefits of the styrene-acrylic copolymer. The composition is cost effective and easy to use, and can easily be rinsed with cold water.

Certain examples and embodiments have been used to describe the invention; it will be apparent to those skilled in the art that various changes may be made to those embodiments and/or examples without departing from the scope of the invention.

We claim:

1. A temporary, water washable coating composition comprising:
   a. water solubilized styrene/acrylic acid copolymer;
   b. alkali swellable copolymer of acrylic and polyester having fatty acid or alcohol moieties having from 14 to 30 carbon atoms different from (a);
   c. water; and
   d. a neutralizing base.

2. The composition of claim 1, further including a polyol plasticizer.

3. The composition of claim 1, further including a colorant, pigment, or filler.

4. The composition of claim 1, further including a surface tension modifying agent.

5. The composition of claim 1 wherein the water solubilized styrene/acrylic acid copolymer has an acid number between 53 to 270, a glass transition temperature between 50 to 128° C. and is present between about 1 and 40% by weight.

6. The composition of claim 1 wherein the neutralization agent for the water solubilized styrene/acrylic acid polymer can be selected from the group consisting of monovalent, divalent, and trivalent ions of metals and elements of groups I, II, III, IV-A, and VIII of the periodic table of the elements, and amines.

7. The composition of claim 1 wherein the alkali swellable copolymer of acrylic and polyester with fatty acid or alcohol moieties is selected from the group consisting of acrylate/steareth-20 itaconate or acrylate/ceteth-20 itaconate copolymer.

8. The composition of claim 1 wherein the alkali swellable acrylate/steareth-20 itaconate or acrylate/ceteth-20 itaconate copolymer is between 0.1 and 10% by weight.

9. The composition of claim 2 wherein the polyol plasticizer is between about 0.1 and 10% by weight.

10. The composition of claim 3 wherein the pigment or filler is between about 1 and about 60% by weight.

11. The composition of claim 4 wherein the surface tension modifying agent is between about 0.01 and 1.0% by weight.

* * * * *